(12) United States Patent
Tanaka et al.

(10) Patent No.: US 7,625,958 B2
(45) Date of Patent: *Dec. 1, 2009

(54) WATER DISPERSION FOR INK-JET PRINTING

(75) Inventors: Nobushige Tanaka, Wakayama (JP); Koji Azuma, Wakayama (JP); Takehiro Tsutsumi, Osaka (JP)

(73) Assignee: KAO Corporation, Tokyo (JP)

( * ) Notice: Subject to any disclaimer, the term of this patent is extended or adjusted under 35 U.S.C. 154(b) by 610 days.

This patent is subject to a terminal disclaimer.

(21) Appl. No.: 11/190,965

(22) Filed: Jul. 28, 2005

(65) Prior Publication Data

US 2006/0030641 A1 Feb. 9, 2006

(30) Foreign Application Priority Data

Aug. 6, 2004 (JP) .............................. 2004-230874

(51) Int. Cl.
| | |
|---|---|
| *C08L 25/00* | (2006.01) |
| *C08L 31/00* | (2006.01) |
| *C08L 33/00* | (2006.01) |
| *C08L 33/06* | (2006.01) |
| *C09B 67/00* | (2006.01) |
| *C08F 297/02* | (2006.01) |
| *C09D 5/00* | (2006.01) |
| *C09D 5/02* | (2006.01) |
| *C09D 11/00* | (2006.01) |

(52) U.S. Cl. ..................... 523/160; 106/31.13; 523/161; 524/556; 524/560; 524/577

(58) Field of Classification Search ................. 523/160, 523/161; 106/31.13; 524/556, 577, 560

See application file for complete search history.

(56) References Cited

U.S. PATENT DOCUMENTS 6,730,780 B2 * 5/2004 Wakabayashi et al. ...... 534/591
6,852,777 B1 * 2/2005 Nakano et al. .............. 523/160

FOREIGN PATENT DOCUMENTS

WO     WO 00/39226    *   6/2000

* cited by examiner

*Primary Examiner*—Patrick D Niland
(74) *Attorney, Agent, or Firm*—Oblon, Spivak, McClelland, Maier & Neustadt, L.L.P.

(57) ABSTRACT

Provided are a water dispersion for ink-jet printing, wherein it is a water dispersion of water-insoluble graft polymer particles containing a colorant; the above graft polymer contains a principal chain having a constitutional unit derived from a vinyl base monomer and a side chain which is derived from a macromer containing an aromatic ring and having a polymerizable functional group at one end; both of the Log P values of the above principal chain and the above side chain are positive; and a difference between both falls in a specific range, and a water-based ink containing the same. The above water-based ink is excellent in a discharge stability, a storage stability, a heat stability and a water resistance.

14 Claims, No Drawings

WATER DISPERSION FOR INK-JET PRINTING

FIELD OF THE INVENTION

The present invention relates to a water dispersion for ink-jet printing and a water-based ink for ink-jet printing containing the same.

BACKGROUND OF THE INVENTION

In an ink-jet printing method, droplets of an ink are discharged directly onto a recording medium from very fine nozzles and allowed to adhere to the recording medium to form characters and images. The above method is widely used in recent years because of not only the advantage that an apparatus used generates low noise and has a good operating property but also the advantages that colorization is easy and that plain paper can be used as a recording medium.

In recent years, inks (hereinafter referred as "pigment base inks") using a pigment or a hydrophobic dye as a colorant are mainly used for inks used for ink-jet printers from the viewpoint of a water resistance and a weatherability.

When a pigment base ink using a polymer is used for ink-jet printing of a thermal system, discharge stability, storage stability and heat stability of higher levels are required as compared with the case of a piezo system.

It is considered to be effective as means for elevating a storage stability of pigment base inks to raise a dispersibility of a pigment by a polymer. Thus, macromers and graft polymers having a long chain alkyl group are used as a structural component for a polymer.

Known as the macromers are styrene-homopolymerized macromers having a polymerizable functional group at one end or copolymerized macromers of styrene with other monomers, silicon macromers and alkyl (meth)acrylate macromers (refer to, for example, Japanese Patent Application Laid-Open No. 100810/1994, Japanese Patent Application Laid-Open No. 247796/2001, Japanese Patent Application Laid-Open No. 338783/2002, Japanese Patent Application Laid-Open No. 255870/2004, International Publication No. 00/39226, Japanese Patent Application Laid-Open (through PCT) No. 526259/2002 and Japanese Patent Application Laid-Open (through PCT) No. 517063/2003).

However, when conventional water-based inks are used for ink-jet printing of a thermal system, the heat stability thereof have not sufficiently been satisfactory. A reduction in a heat stability of the inks causes clogging in the nozzles of a printer and causes as well a reduction in a discharge stability thereof.

Methods in which a molecular weight of graft polymers is raised and in which a copolymerization amount of macromers in the above polymers is increased are considered as means for elevating a heat stability of a pigment base ink. However, this causes an increase in a viscosity of the water dispersion, which leads in turn to an increase in a viscosity of the water-based ink, and the water-based ink is reduced in a discharge stability to bring about problems such as starving of the printed letters.

SUMMARY OF THE INVENTION

The present invention relates to a water dispersion for ink-jet printing containing water-insoluble graft polymer particles containing a colorant. A water-insoluble graft polymer contained therein contains a principal chain (A) having a constitutional unit derived from a vinyl base monomer and a side chain (B) which is derived from a macromer (a) containing an aromatic ring and having a polymerizable functional group at one end, wherein both of the Log P values of the above principal chain (A) and the above side chain (B) are positive, and the value of [(Log P value of the side chain)–(Log P value of the principal chain)] is 1.7 to 12.

Also, the present invention relates to a water dispersion for ink-jet printing, wherein a water-insoluble graft polymer contained therein contains a principal chain (A-1) having a constitutional unit derived from a salt-forming group-containing monomer (b) and a constitutional unit derived from a hydrophobic monomer (c) and a side chain (B-1) derived from a macromer (aa) having an acryloyloxy group or a methacryloyloxy group at one end of a polymer obtained by copolymerizing alkyl(meth)acrylate having 6 to 30 carbon atoms with a vinyl monomer having an aromatic ring 6 to 30 carbon atoms.

Further, the present invention relates to a water-based ink containing the above water dispersions.

DETAILED DESCRIPTION OF THE INVENTION

The present invention relates to a water dispersion for ink-jet printing which can provide a water-based ink with excellent discharge stability, storage stability and heat stability and a high water resistance and a water-based ink for ink-jet printing containing the above water dispersion.

The present inventors have found that use of a water-insoluble graft polymer which contains an aromatic ring at a side chain of the polymer and in which the Log P values of the principal chain and the side chain fall in a preferred specific range makes it possible to raise the discharge stability, the storage stability and the heat stability as compared with those in a case using conventional water-insoluble polymers.

That is, the present invention relates to:

(1) a water dispersion for ink-jet printing, wherein it is a water dispersion of water-insoluble graft polymer particles containing a colorant; the above water-insoluble graft polymer contains a principal chain (A) having a constitutional unit derived from a vinyl base monomer and a side chain (B) which is derived from a macromer (a) containing an aromatic ring and having a polymerizable functional group at one end; both of the Log P values of the above principal chain (A) and the above side chain (B) are positive; and the value of [(Log P value of the side chain)–(Log P value of the principal chain)] is 1.7 to 12, (2) a water dispersion for ink-jet printing, wherein it is a water dispersion of water-insoluble graft polymer particles containing a colorant; the above water-insoluble graft polymer contains a principal chain (A-1) having a constitutional unit derived from a salt-forming group-containing monomer (b) and a constitutional unit derived from a hydrophobic monomer (c) and a side chain (B-1) derived from a macromer (aa) having an acryloyloxy group or a methacryloyloxy group at one end of a polymer obtained by copolymerizing alkyl(meth)acrylate having 6 to 30 carbon atoms with a vinyl monomer having an aromatic ring having 6 to 30 carbon atoms, and (3) a water-based ink for ink-jet printing containing the water dispersion as described in the above item (1) or (2).

Water-insoluble Graft Polymer

The "graft polymer" in the water-insoluble graft polymer used in the present invention means a polymer obtained by copolymerizing the principal chain (A) having a constitutional unit derived from a vinyl base monomer, preferably the principal chain (A-1) having a constitutional unit derived from a salt-forming group-containing monomer (b) and a constitutional unit derived from a hydrophobic monomer (c) as the constitutional unit derived from a vinyl base monomer with the side chain (B) which is derived from a macromer (a) containing an aromatic ring and having a polymerizable functional group at one end, preferably the side chain (B-1) derived from a macromer (aa) having an acryloyloxy group or a methacryloyloxy group at one end of a polymer obtained by copolymerizing alkyl(meth)acrylate having 6 to 30 carbon atoms with a vinyl monomer having an aromatic ring having 6 to 30 carbon atoms, via the polymerizable functional group thereof.

The side chain of the water-insoluble graft polymer used in the present specification is obtained from the constitutional unit derived from a vinyl base monomer.

The "Log P value" used in the present invention means a logarithmic value of a partition coefficient of a monomer in 1-octanol/water, and used therefor is a numerical value calculated by fragment approach according to SRC's LOGKOW/KOWWIN Program of KowWin (Syracuse Research Corporation, USA) (The KowWin Program methodology is described in the following journal article: Meylan, W. M. and P. H. Howard. 1995. Atom/fragment contribution method for estimating octanol/water partition coefficients. J. Pharm. Sci. 84: 83-92). A fragment approach is based on the chemical structure of a compound, and the number of atoms and the type of a chemical bond are considered. In general, a Log P value is a numerical value used for relative evaluation of hydrophilicity and hydrophobicity of a compound such as a polymer and the like.

The Log P values of the principal chain and the side chain of the graft polymer are calculated in the following manner.

Calculating Method of Log P Value of Principal Chain

1. The Log P values of the respective monomers which the respective constitutional units constituting the polymer chain of the principal chain derive from are determined by the SRC's LOGKOW/KOWWIN Program described above. A polymer structure which a chain transfer agent and an initiator derive from is excluded.
2. The Log P values of the respective monomers are multiplied by a mole fraction (M) of the constitutional unit derived from the monomer in the principal chain to determine (Log P×M) of the respective monomers.
3. All of (Log P×M) of the respective monomers obtained in 2 described above are summed up to thereby calculate Log P values of the principal chain.

Calculating Method of Log P Value of Side Chain

The Log P values of the respective side chains are calculated in the same manner as in the calculating method 1 to 3 of the principal chain.

However, when two or more kinds of the side chains are present, 1. the Log P values of the respective side chains are multiplied by a mole fraction (M) of the side chain based on all chains to determine (Log P×M) and
2. all of (Log P×M) of the respective side chains are summed up to thereby calculate Log P of the side chain.

Those other than the side chain which is derived from the macromer (a) containing an aromatic ring and having a polymerizable functional group at one end are included in the calculation of the side chains only in the case of those obtained from a constitutional unit derived from a vinyl base monomer.

The Log P of the salt-forming group-containing monomer (b) is calculated based on the Log P value of the above monomer before neutralizing. The polymerizable functional group (for example, methacryloyoxy and the like) present at one end of the macromer falls outside the targets in the calculation of the Log P value of the principal chain.

For example, in the case of a graft polymer synthesized from methyl methacrylate/methacrylic acid/styrene macromer in a ratio of 60 parts by weight/20 parts by weight/20 parts by weight, a principal chain is a copolymer of methyl methacrylate-methacrylic acid, and a side chain is the styrene macromer. The Log P value of the side chain is 2.89 since it is a homopolymer of styrene (Log P value=2.89), and the Log P value of the principal chain is the total value of values obtained by multiplying the Log P values of the respective monomers of methyl methacrylate (Log P value=1.28) (Mw: 100) and methacrylic acid (Log P value=0.99) (Mw: 86) by respective mole %. It is 1.20 [=1.28×60/100/(60/100+20/86)+0.99×20/86/(60/100+20/86)]. Accordingly, the value of [(Log P value of the side chain)−(Log P value of the principal chain)] of the above graft polymer is 1.7.

In the case of a graft polymer synthesized from methyl methacrylate/methacrylic acid/styrene macromer/2-ethylhexyl methacrylate macromer in a ratio of 60 parts by weight/20 parts by weight/10 parts by weight/10 parts by weight as an example in which two or more kinds of side chains are present, a principal chain is a copolymer of methyl methacrylate-methacrylic acid, and side chains are the styrene macromer and the 2-ethylhexyl methacrylate macromer. The first side chain is a homopolymer of styrene (Log P value=2.89), and the second side chain is a homopolymer of 2-ethylhexyl methacrylate (Log P value=4.64). When a number average molecular weight of the first side chain is 2700 and a number average molecular weight of the second side chain is 1700, the Log P value of the side chain is the total value of values obtained by multiplying the Log P values of the respective side chains by respective mole %, and it is 3.96 [=2.89×10/2700/(10/2700/+10/1700)+4.64×10/1700/(10/2700/+10/1700)].

The Log P value of the principal chain is the total value of values obtained by multiplying the Log P values of the respective monomers of methyl methacrylate and methacrylic acid by respective mole %, and it is 1.20. Accordingly, the value of [(Log P value of the side chain)−(Log P value of the principal chain)] of the above graft polymer is 2.8.

The above water-insoluble graft polymer used in the present invention has a suitable absorbing property to a colorant.

In respect to a "water insolubility" of the water-insoluble graft polymer used in the present invention, a dissolving amount (25° C.) thereof in 100 g of water is preferably 10 g or less, more preferably 5 g or less and particularly preferably 1 g or less from the viewpoint of a reduction in a viscosity of the water-based ink. When it has a salt-forming group, the dissolving amount means a dissolving amount of the water-insoluble vinyl polymer after neutralized by 100% with sodium hydroxide or acetic acid according to the kind of the above salt-forming group.

The water dispersion (hereinafter referred to merely as the "water dispersion") of the present invention for ink-jet printing contains water-insoluble graft polymer particles containing a colorant which are dispersed in water.

In this case, the form of the water-insoluble graft polymer particles containing a colorant shall not specifically be restricted and may be any one as long as the particles are formed at least from the colorant and the water-insoluble graft polymer. It includes, for example, a particle form in which the colorant is included in the water-insoluble graft polymer, a particle form in which the colorant is evenly dispersed in the water-insoluble graft polymer and a particle form in which a part of the colorant is included in the water-insoluble graft polymer but the colorant is exposed on the surface of the particles.

The first embodiment of the water-insoluble graft polymer used in the present invention contains the principal chain (A) having a constitutional unit derived from a vinyl base monomer and the side chain (B) which is derived from the macromer (a) containing an aromatic ring and having a polymerizable functional group at one end, wherein both of the Log P values of the principal chain (A) and the side chain (B) are positive, and the value of [(Log P value of the side chain)–(Log P value of the principal chain)] is 1.7 to 12.

A pigment which is the colorant has an aromatic ring in many cases, and therefore it is considered that the side chain containing an aromatic ring makes it possible to strengthen interaction between the aromatic rings. As a result thereof, provided are the effects that the adsorbing strength to the ink is increased and that the storage stability and the heat stability are elevated.

It leads to a rise in a hydrophobicity of the whole part of the polymer that both of the Log P values of the principal chain and the side chain are positive. Accordingly, the water-based ink produced from the water dispersion of the present invention has the effect that the storage stability and the heat stability are high.

It is considered that the higher Log P value of the side chain than the Log P value of the principal chain leads to the presence of a higher affinity between the pigment having a hydrophobic surface and the side chain. As a result thereof, provided are the effects that the adsorbing strength of the polymer to the surface of the pigment is raised and that the storage stability and the heat stability are elevated.

The value of [(Log P value of the side chain)–(Log P value of the principal chain)] is 1.7 to 12, preferably 1.9 to 10 and more preferably 2.0 to 8. If the value of [(Log P value of the side chain)–(Log P value of the principal chain)] falls in the range described above, the water-insoluble graft polymer exhibits further more the effects as a stable dispersant in the water-based ink. The Log P values of the side chains including the side chains other than the side chain (B) can be determined by calculation as described above.

The Log P value of the side chain (B) is preferably 3.5 to 12, more preferably 4.0 to 9 in order to elevate the affinity to a pigment base ink and raise the print density, the storage stability and the heat stability.

The second embodiment of the water-insoluble graft polymer used in the present invention includes a water dispersion of water-insoluble graft polymer particles containing a colorant, wherein the above water-insoluble graft polymer contains a principal chain (A-1) having a constitutional unit derived from a salt-forming group-containing monomer (b) and a constitutional unit derived from a hydrophobic monomer (c) and a side chain (B-1) derived from a macromer (aa) having an acryloyloxy group or a methacryloyloxy group at one end of a polymer obtained by copolymerizing alkyl (meth)acrylate having 6 to 30 carbon atoms with a vinyl monomer having an aromatic ring having 6 to 30 carbon atoms.

The above water-insoluble graft polymer is obtained preferably by copolymerizing a monomer mixture (hereinafter referred to as the "monomer mixture") containing the macromer (a) or macromer (aa), the salt-forming group-containing monomer (b) and the hydrophobic monomer (c).

The contents of (a) or (aa), (b) and (c) each described above are preferably 10 to 50% by weight for (a) or (aa), 5 to 40% by weight for (b) and 10 to 50% by weight for (c) as described later.

The monomers which are common to the first embodiment and the second embodiment shall be described below.

Macromer (a)

The macromer (a) is used in order to allow the pigment to be sufficiently contained in the polymer particles. The macromer (a) is preferably the macromer (aa) having an acryloyloxy group or a methacryloyloxy group as a polymerizable functional group at one end of a polymer obtained by copolymerizing alkyl(meth)acrylate (a-1) having 6 to 30 carbon atoms with a vinyl monomer (a-2) having an aromatic ring having 6 to 30 carbon atoms.

The alkyl(meth)acrylate of (a-1) is a alkyl(meth)acrylate in which an ester part has inear, branched or cyclic alkyl group having 6 to 30 carbon atoms, preferably 8 to 18 carbon atoms. The alkyl(meth)acrylate (a-1) includes, for example, (meth) acrylic acid esters, to be specific, (iso or tertiary)butyl(meth) acrylate, (iso)amyl(meth)acrylate, cyclohexyl(meth)acrylate, 2-ethylhexyl(meth)acrylate, (iso)octyl(meth)acrylate, (iso)decyl(meth)acrylate, (iso)dodecyl(meth)acrylate and (iso)stearyl(meth)acrylate.

A content of the alkyl(meth)acrylate (a-1) is preferably 50% by weight or more, more preferably 60% by weight or more and further preferably 70% by weight or more based on the macromer (a) from the viewpoint that the pigment is allowed to be sufficiently contained in the polymer particles.

In the present specification, the term "(iso or tertiary)" and "(iso)" show both of a case where a branched structure represented by "iso" or "tertiary" is present and a case where it is not present (normal). Further, the term "(meth)acryl" means "acryl" or "methacryl".

The vinyl monomer of (a-2) having an aromatic ring is a vinyl monomer having an aromatic ring having 6 to 30 carbon atoms, preferably 6 to 22 carbon atoms. The vinyl monomer (a-2) includes, for example, styrene, α-methylstyrene, vinylnaphthalene, vinyltoluene, ethylvinylbenzene, 4-vinylphenyl, 1,1-diphenylethylene, benzyl(meth)acrylate, phenoxyethyl(meth)acrylate, 2-hydroxy-3-phenoxypropyl acrylate, 2-methacryloyloxyethyl-2-hydroxypropyl phthalate and 2-acryloyloxyethylphthalic acid.

The above alkyl(meth)acrylates (a-1) and vinyl monomers (a-2) each can be used alone or in a mixture of two or more kinds thereof.

The particularly suitable example of the macromer (a) includes a macromer having an acryloyloxy group or a methacryloyloxy group as a polymerizable functional group at one end of a polymer obtained by copolymerizing alkyl(meth) acrylate selected from 2-ethylhexyl(meth)acrylate, (iso) dodecyl(meth)acrylate and (iso)stearyl(meth)acrylate with a vinyl monomer having an aromatic ring selected from styrene and benzyl(meth)acrylate.

A weight ratio (a-1)/(a-2) of the alkyl(meth)acrylates (a-1) to the vinyl monomer of (a-2) having an aromatic ring is preferably 40/60 to 95/5, more preferably 50/50 to 95/5 and particularly preferably 60/40 to 90/10 in order to raise the print density, the storage stability and the heat stability and control the Log P value of the side chain (B) to 3.5 to 12.

Methods described in, for example, Japanese Patent Publication No. 11224/1968, ditto 16147/1968 and Japanese Patent Application Laid-Open No. 133007/1985 can be given as a method for preparing the macromer (a).

A weight average molecular weight of the macromer (a) used in the present invention is preferably 1,000 to 8,000, more preferably 3,000 to 6,000 and a number average molecular weight of the macromer (a) is preferably 1,000 to 5,000, more preferably 2,000 to 4,000 from the viewpoint that the viscosity is controlled to a lower level while raising the copolymerization ratio in order to elevate the storage stability. If they fall in the above ranges, the storage stability is excellent, and a viscosity of the water dispersion can be controlled to a lower level.

The weight average molecular weight and the number average molecular weight of the macromer (a) used in the present invention are values measured by gel permeation chromatography using polystyrene as a standard material and using tetrahydrofuran containing acetic acid of 50 mmol/L as a solvent.

A content of the macromer (a) in the monomer mixture used for producing the water-insoluble graft polymer, that is, a content of the constitutional unit derived from the macromer (a) contained in the water-insoluble graft polymer used for the present invention is preferably 10 to 50% by weight, more preferably 12 to 45% by weight and particularly preferably 15 to 40% by weight from the viewpoint that the pigment is allowed to be sufficiently contained in the polymer.

Salt-forming Group-containing Monomer (b)

The salt-forming group-containing monomer (b) is used from the viewpoint of raising a storage stability of the water dispersion of the polymer particles, and it includes, for example, cationic monomers and anionic monomers. The salt-forming group includes, for example, cationic groups such as amino group and ammonium group and anionic groups such as carboxyl group, sulfonic group and phosphoric group. To be specific, the examples of the salt-forming group-containing monomer include those described in the 24th line of the 7th column to the 29th line of the 8th column at page 5 of Japanese Patent Application Laid-Open No. 286939/1997.

The representative examples of the cationic monomers include unsaturated tertiary amine-containing monomers and unsaturated ammonium salt-containing monomers. Among the cationic monomers, N-(N',N'-dimethylaminopropyl)(meth)acrylamide is preferred.

The representative examples of the anionic monomers include unsaturated carboxylic acid monomers, unsaturated sulfonic acid monomers and unsaturated phosphoric acid monomers. Among the anionic monomers, preferred are the unsaturated carboxylic acid monomers such as acrylic acid, methacrylic acid, crotonic acid, itaconic acid, maleic acid, fumaric acid, citraconic acid and 2-methacryloyoxymethyl-succinic acid.

The above salt-forming group-containing monomers (b) each can be used alone or in a mixture of two or more kinds thereof.

A content of the salt-forming group-containing monomer (b) (a content as a non-neutralized amount; hereinafter, it shall be calculated as a non-neutralized amount of a salt-forming group-containing monomer) in the monomer mixture used for producing the water-insoluble graft polymer, that is, a content of the constitutional unit derived from the salt-forming group-containing monomer (b) based on the water-insoluble graft polymer used for the present invention is preferably 5 to 40% by weight, more preferably 8 to 35% by weight and further preferably 10 to 30% by weight from the viewpoint that a storage stability of the water dispersion of the above polymer particles is raised.

Hydrophobic Monomer (c)

The hydrophobic monomer (c) is used from the viewpoint of raising a storage stability of the water dispersion of the polymer particles, and it includes, alkyl(meth)acrylate and aromatic ring-containing monomers.

Alkyl(meth)acrylate includes (meth)acrylic acid esters in which an ester part has an alkyl group having 1 to 30 carbon atoms, preferably 4 to 18 carbon atoms. It includes, for example, methyl(meth)acrylate, ethyl(meth)acrylate, (iso)propyl(meth)acrylate, (iso or tertiary)butyl(meth)acrylate, (iso)amyl(meth)acrylate, cyclohexyl(meth)acrylate, 2-ethylhexyl(meth)acrylate, (iso)octyl(meth)acrylate, (iso)decyl(meth)acrylate, (iso)dodecyl(meth)acrylate and (iso)stearyl(meth)acrylate.

The aromatic ring-containing monomer includes the vinyl monomers having an aromatic ring having 6 to 30 carbon atoms, preferably 6 to 22 carbon atoms, which have been described in the item of the macromer (a).

The above hydrophobic monomers (c) each can be used alone or in a mixture of two or more kinds thereof.

A content of the hydrophobic monomer (c) contained in the monomer mixture used for producing the water-insoluble graft polymer, that is, a content of the constitutional unit derived from the hydrophobic monomer (c) based on the water-insoluble graft polymer used for the present invention is preferably 10 to 50% by weight, more preferably 15 to 48% by weight and further preferably 20 to 45% by weight from the viewpoint that a storage stability of the water dispersion of the above polymer particles is raised.

A weight ratio (c)/(b) of the hydrophobic monomer (c) to the salt-forming group-containing monomer (b) is preferably 30/70 to 80/20, more preferably 50/50 to 75/25 and particularly preferably 60/40 to 75/25 in order to raise a hydrophobicity of the water-insoluble graft polymer and elevate the storage stability and the heat stability and to make the Log P value of the principal chain (A) positive.

A content $\{[(a)/((a)+(b)+(c))]\times 100\}$ of the macromer (a) based on the total amount of the macromer (a), the salt-forming group-containing monomer (b) and the hydrophobic monomer (c) is preferably 15 to 70% by weight, more preferably 17 to 60% by weight and further preferably 20 to 50% by weight in order to provide the water-insoluble graft polymer used in the present invention with a high affinity with the pigment and elevate an effect as the dispersant and to control the value of [(Log P value of the side chain)−(Log P value of the principal chain)] to 1.7 to 12.

Other Monomers

Other monomers may further be contained in the monomer mixture used for producing the water-insoluble graft polymer.

The other monomers used if necessary include a nonionic monomer (d) and (meth)acrylamide base monomers.

A compound represented by Formula (I) is preferably used as the nonionic monomer (d):

$$CH_2=C(R^1)C(O)O(Y^1O)_p-R^2 \qquad (I)$$

wherein $Y^1$ represents an alkylene group having 2 to 3 carbon atoms which may be branched; p is an average addition mole number and represents a number of 1 to 30; $R^1$ represents a hydrogen atom or methyl; $R^2$ represents a hydrogen atom or an alkyl group having 1 to 12 carbon atoms which may be branched, an aryl group having 6 to 12 carbon atoms or an aralkyl group.

In this case, a combination in which at least one of $Y^1$, $R^1$ and $R^2$ is different can optionally be selected and used. $Y^1$ of p groups may be the same or different and is preferably ethylene, propylene or tetramethylene, and they may be bonded by either of block bonding and random bonding. The suffix p means an average addition mole number and is preferably 2 to 30. $R^2$ is preferably a hydrogen atom or an alkyl group having 1 to 8 carbon atoms (for example, methyl, 2-ethylhexyl and the like).

The specific examples of the compound represented by Formula (I) include polyethylene glycol (1 to 30: showing the value of p in Formula (I); hereinafter the same shall apply) monomethacrylate, polypropylene glycol (1 to 30) monomethacrylate, polytetramethylene glycol (1 to 30) monomethacrylate, methoxypolyethylene glycol (1 to 30) monomethacrylate, phenoxypolyethylene glycol (1 to 30) monomethacrylate and methoxy(ethylene glycol propylene glycol copolymer) (1 to 30: ethylene glycol out of them: 1 to 29) (meth)acrylate.

A content of the nonionic monomer (d) contained in the monomer mixture used for producing the water-insoluble graft polymer, that is, a content of the constitutional unit derived from the nonionic monomer (d) based on the water-insoluble graft polymer used for the present invention is preferably 5 to 40% by weight, more preferably 7 to 35% by weight and further preferably 10 to 30% by weight from the viewpoint that a storage stability of the water dispersion of the above polymer particles is raised.

The (meth)acrylamide base monomer includes N,N-dimethyl(meth)acrylamide, N-t-butyl(meth)acrylamide, N-t-octyl(meth)acrylamide, N-isopropyl(meth)acrylamide and 2-(meth)acrylamide-2-methylpropanesulfonic acid.

Production of Water-insoluble Graft Polymer

The water-insoluble graft polymer used in the present invention can be produced by polymerizing the monomer mixture described above by a known polymerizing method such as a bulk polymerizing method, a solution polymerizing method, a suspension polymerizing method and an emulsion polymerizing method. Among the above polymerizing methods, the solution polymerizing method is preferred.

The solvent used in the solution polymerizing method is preferably a polar organic solvent. When a water miscible organic solvent is used as the polar organic solvent, the mixture of the water miscible organic solvent with water can be used as well.

The polar organic solvent includes, for example, aliphatic alcohols having 1 to 3 carbon atoms, such as methanol, ethanol, propanol and the like; ketones such as acetone, methyl ethyl ketone, methyl isobutyl ketone and the like; and ester such as ethyl acetate and the like. Among them, methanol, ethanol, acetone, methyl ethyl ketone or a mixed solvent of at least one of them and water is preferred.

A radical polymerization initiator can be used in the polymerization. The preferred radical polymerization initiator includes 2,2'-azobisisobutyronitrile, 2,2'-azobis(2,4-dimethylvaleronitrile), dimethyl-2,2'-azobisisobutylate, 2,2'-azobis(2-methylbutyronitrile) and 1,1'-azobis(1-cyclohexanecarbonitrile). Further, organic peroxides such as t-butyl peroxyoctoate, di-t-butyl peroxide and dibenzoyl oxide can be used as the radical polymerization initiator.

An amount of the radical polymerization initiator added to the monomer mixture which is the raw material is preferably 0.001 to 5 moles, more preferably 0.01 to 2 moles per mole of the above monomer mixture.

A chain transfer agent may further be added in the polymerization. The specific examples of the chain transfer agent include mercaptans such as octylmercaptan, n-dodecylmercaptan, t-dodecylmercaptan, n-tetradecylmercaptan and mercaptoethanol; thiuram disulfides; hydrocarbons; unsaturated cyclic hydrocarbons; and unsaturated heterocyclic compounds. They can be used alone or in a mixture of two or more kinds thereof.

The polymerization conditions of the monomer mixture are different according to the kinds of the radical polymerization initiator used, the monomers and the solvent, and therefore they can not definitely be determined. Usually, the polymerization temperature is 30 to 100° C., preferably 50 to 80° C., and the polymerization time is 1 to 20 hours. The polymerization atmosphere is preferably inert gas atmosphere of nitrogen gas and the like.

After finishing the polymerization reaction, the water-insoluble graft polymer produced can be isolated from the reaction liquid by a known method such as reprecipitation, solvent distillation and the like. The water-insoluble graft polymer obtained can be refined by repeating reprecipitation and removing the unreacted monomers by membrane separation, a chromatograph method and an extraction method.

A weight average molecular weight of the water-insoluble graft polymer used in the present invention is preferably 5,000 to 300,000, more preferably 5,000 to 200,000 and particularly preferably 10,000 to 150,000 from the viewpoints of raising a discharge property of the water-based ink, preventing clogging of a printer head and elevating a storage stability of the water dispersion.

The weight average molecular weight of the water-insoluble graft polymer is a value measured by gel permeation chromatography using polystyrene as a standard material and using dimethylforamide dissolving phosphoric acid of 60 mmol/L and lithium bromide of 50 mmol/L as solvents.

Colorant

The colorant is preferably a pigment and a hydrophobic dye from the viewpoint of the water resistance. Among them, the pigment is preferred in order to exhibit the high weatherability which is strongly required in recent years. Either of an inorganic pigment and an organic pigment may be used as the pigment. An extender pigment can be used as well, if necessary, in combination with them.

The inorganic pigment includes, for example, carbon blacks, metal oxides, metal sulfides and metal chlorides. Among them, carbon blacks are preferred in the case of a black water-based ink. Carbon black includes furnace black, thermal lamp black, acetylene black and channel black.

The organic pigment includes, for example, azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

The specific examples of the preferred organic pigment include the respective number products such as C.I. Pigment Yellow, C.I. Pigment Red, C.I. Pigment Violet, C.I. Pigment Blue and C.I. Pigment Green.

The extender pigment includes silica, calcium carbonate and talc.

The kind of the hydrophobic dye shall not specifically be restricted as long as it can be allowed to be contained in the polymer particles. The hydrophobic dye includes oil-soluble dyes and disperse dyes, and among them, the oil-soluble dyes are preferred.

The oil-soluble dye includes, for example, the respective number products such as C.I. Solvent Black, C.I. Solvent Yellow, C.I. Solvent Red, C.I. Solvent Violet, C.I. Solvent Blue and C.I. Solvent Orange, and they are commercially available from Orient Chemical Industries Ltd., BASF AG and the like.

The disperse dye includes, for example, the respective number products such as C.I. Disperse Yellow, C.I. Disperse Orange, C.I. Disperse Red, C.I. Disperse Violet, C.I. Disperse Blue and C.I. Disperse Green. Among them, preferred are C.I. Solvent Yellow 29 and 30 as yellow, C.I. Solvent Blue 70 as cyane, C.I. Solvent Red 18 and 49 as magenta and C.I. Solvent Black 3 and 4 and black dyes of a nigrosine base as black.

The colorants described above can be used alone or in a mixture of two or more kinds thereof.

An amount of the colorant used in the present invention is preferably 20 to 400 parts by weight, more preferably 50 to 300 parts by weight per 100 parts by weight of the resin solid matter of the polymer from the viewpoints of a rise in a print density of the water-based ink and an easiness in allowing the colorant to be contained in the water-insoluble graft polymer particles.

A content of the colorant in the water dispersion and the water-based ink of the present invention is preferably 1 to 20% by weight, more preferably 2 to 10% by weight from the viewpoint of raising the print density and the discharge stability.

Production Method of Water Dispersion

The production method of the water dispersion of the present invention shall not specifically be restricted. For example, the water-insoluble graft polymer is dissolved in an organic solvent to obtain a solution, and the pigment is added to the solution thus obtained, followed by pre-kneading the mixture. Then, a neutralizing agent and water are added thereto and kneaded to carry out dispersing treatment, whereby a dispersion of an oil-in-water type is prepared, and a water dispersion is obtained by removing the organic solvent and the neutralizing agent from the kneaded product thus obtained.

In carrying out the kneading and dispersing treatments, capable of being used are, for example, a ball mill, a roll mill, a bead mill, a high pressure homogenizer and a high pressure stirring type disperser. Among them, the high pressure homogenizer is preferred from the viewpoint that an amount of inorganic impurities mixed in can be reduced.

In the production of the water dispersion of the present invention, the organic solvent used for dissolving the water-insoluble graft polymer means an organic solvent having a boiling point of lower than 130° C. at 101 kPa, and to be specific, alcohol base solvents, ketone base solvents and ether base solvents are preferred.

The alcohol base solvents include ethanol, isopropanol, n-butanol, tertiary butanol, isobutanol and diacetone alcohol. The ketone base solvents include acetone, methyl ethyl ketone, diethyl ketone and methyl isobutyl ketone. The ether base solvents include dibutyl ether, tetrahydrofuran and dioxane. Among the above solvents, isopropanol, acetone and methyl ethyl ketone are preferred. The organic solvents described above may be used, if necessary, in combination with high boiling hydrophilic organic solvents.

The high boiling hydrophilic organic solvent means a solvent having a boiling point of 130° C. or higher at 101 kPa, and the examples thereof include phenoxyethanol, ethylene glycol monomethyl ether, diethylene glycol monomethyl ether, diethylene glycol monoethyl ether and diethylene glycol diethyl ether.

Acids or bases can be used as the neutralizing agent according to the kind of a salt-forming group in the water-insoluble graft polymer. The neutralizing agent includes volatile neutralizing agents and non-volatile neutralizing agents.

The volatile neutralizing agent includes acids such as hydrochloric acid, acetic acid and propionic acid and bases such as ammonia, methylamine, dimethylamine, trimethylamine, ethylamine, diethylamine and triethylamine.

The non-volatile neutralizing agent includes acids such as phosphoric acid, sulfuric acid, lactic acid, succinic acid, glycolic acid, gluconic acid and glyceric acid and bases such as sodium hydroxide and potassium hydroxide.

A mole ratio (volatile neutralizing agent: non-volatile neutralizing agent) of the volatile neutralizing agent to the non-volatile neutralizing agent is preferably 1:99 to 50:50, more preferably 10:90 to 40:60 from the viewpoint of a rise in a dispersibility of the colorant and a storage stability of the water dispersion.

A neutralization degree of the salt-forming group in the water-insoluble graft polymer used in the present invention is preferably 10 to 200%, more preferably 20 to 150% and particularly preferably 50 to 150%.

In this case, the neutralization degree can be determined by the following equation when the salt-forming group is an anionic group:

$$\{[\text{weight (g) of neutralizing agent/equivalent of neutralizing agent}]/[\text{acid value (KOH mg/g) of polymer} \times \text{weight (g) of polymer}/(56 \times 1000)]\} \times 100$$

The neutralization degree can be determined by the following equation when the salt-forming group is a cationic group:

$$\{[\text{weight (g) of neutralizing agent/equivalent of neutralizing agent}]/[\text{amine value (HCL mg/g) of polymer} \times \text{weight (g) of polymer}/(36.5 \times 1000)]\} \times 100$$

An acid value and an amine value can be calculated from a constitutional unit of the polymer. Or, they can be determined as well by a method in which the polymer is dissolved in a suitable solvent (for example, methyl ethyl ketone) to titrate the solution.

The water-insoluble graft polymer particles containing the colorant in the water dispersion and the water-based ink thus obtained have an average particle diameter of preferably 0.01 to 0.5 μm, more preferably 0.03 to 0.3 μm and particularly preferably 0.05 to 0.2 μm from the viewpoints of a prevention in clogging of nozzles in a printer and a dispersion stability of the above polymer particles. The average particle diameter can be measured by a laser particle analytical system ELS-8000 (cumulant analysis) of Otuka Electronics Co., Ltd. The measuring conditions are a temperature of 25° C., an angle of 90 degrees between incident light and a detector and an integrating frequency of 100 times, and a refractive index (1.333) of water is input as a refractive index of a dispersing solvent. A measured concentration of the water-insoluble graft polymer particles containing the colorant is usually an extent of $5 \times 10^{-3}$% by weight.

A content of water in the water dispersion and the water-based ink of the present invention is preferably 30 to 90% by weight, more preferably 40 to 80% by weight. The kind of water shall not specifically be restricted, and optional water such as distilled water and ion-exchanged water can be used.

An amount of the water dispersion in the water dispersion and the water-based ink of the present invention are preferably controlled so that a content (solid matter content) of the water-insoluble graft polymer particles containing the colorant in the water-based ink is preferably 1 to 50% by weight, more preferably 5 to 30% by weight from the viewpoint of securing the good print density, a discharge stability of the ink and a storage stability of the water dispersion.

The water dispersion for ink-jet printing of the present invention may be used as a water-based ink as it is, and allowed to be added and mixed therewith are a wetting agent, a dispersant, a defoaming agent, a penetrant, a viscosity-controlling agent, a mildew-proof agent, a rust-preventive agent and a chelating agent.

The wetting agent includes, for example, polyhydric alcohols such as ethylene glycol, propylene glycol, diethylene glycol, triethylene glycol, polyethylene glycol, glycerin, diethylene glycol diethyl ether and diethylene glycerin monon-butyl ether and ethers thereof, acetates and nitrogen-containing compounds such as N-methyl-2-pyrrolidone and 1,3-dimethylimidazolidinone. An amount of the wetting agent in the water-based ink is preferably 0.1 to 50% by weight, more preferably 0.1 to 30% by weight.

Anionic, cationic, nonionic and amphoteric dispersants such as surfactants can be used as the dispersant. A content of the dispersant in the water-based ink is preferably 0.1 to 50% by weight, more preferably 1 to 20% by weight.

The defoaming agent includes a compound represented by the following Formula (II):

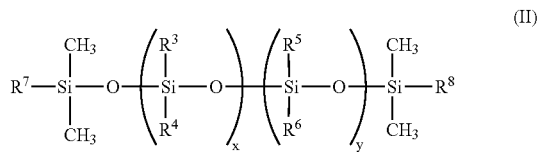

wherein $R^3$, $R^4$, $R^5$ and $R^6$ each represent independently an alkyl group having 1 to 10 carbon atoms or a phenyl group which may have a substituent; $R^7$ and $R^8$ each represent independently an alkyl group having 1 to 10 carbon atoms, a phenyl group which may have a substituent, a hydroxyl group, an amino group, a carboxyl group or an epoxy group; and x and y each represent independently an integer of 0 to 1000, preferably 10 to 100.

The above compound is preferred from the viewpoints of an inhibition in generating foams in preparing the water-based ink and controlling a surface tension of the water-based ink.

A content of the defoaming agent in the water-based ink is preferably 0.001 to 2.0% by weight, more preferably 0.005 to 0.5% by weight from the viewpoints of an inhibition in generating foams and a rise in a discharge stability of the water-based ink.

In addition thereto, known optional compounds can be used for the mildew-proof agent and the chelating agent in the water-based ink.

Thus, the water-based ink of the present invention is obtained. The water-based ink of the present invention has the structure described above and therefore is very excellent in a discharge stability, a storage stability, a heat stability and a water resistance.

EXAMPLES

In the following preparation examples, examples and comparative examples, numerical values show parts by weight, and % shows % by weight unless otherwise described.

Preparation Example 1

Preparation of a lauryl methacrylate/benzyl methacrylate-copolymerized Macromer Having a Polymerizable Functional Group at One End Synthetic Method of Copolymer A reactor was charged with 25 parts by weight of methyl ethyl ketone and the prescribed amounts of monomers shown in an "initial charged monomers" column in Table 1 and a chain transfer agent to mix them, and substitution with nitrogen gas was sufficiently carried out to obtain a mixed solution.

On the other hand, a dropping funnel (a) was charged with the prescribed amounts of monomers shown in a "dropped monomers" column in Table 1 and the chain transfer agent, and 100 parts by weight of methyl ethyl ketone and 2 parts by weight of 4,4'-azobis(4-cyanovaleric acid) were added thereto and mixed, followed by sufficiently carrying out substitution with nitrogen gas to obtain a mixed solution.

Further, a dropping funnel (b) was charged with 125 parts by weight of methyl ethyl ketone, 2 parts by weight of mercaptopropionic acid and 2 parts by weight of 4,4'-azobis(4-cyanovaleric acid) to mix them, and substitution with nitrogen gas was sufficiently carried out to obtain a mixed solution.

The mixed solution in the reactor was heated up to 75° C. under nitrogen atmosphere while stirring, and the mixed solution in the dropping funnel (a) was slowly dropwise added in 4 hours. After finishing dropwise adding, the mixed solution in the dropping funnel (b) was slowly dropwise added in 2 hours. Further, the solution was matured at 80° C. for one hour to obtain a lauryl methacrylate/benzyl methacrylate copolymer solution.

Introduction of a Polymerizable Functional Group

A reactor equipped with an air-introducing tube was charged with the lauryl methacrylate/benzyl methacrylate copolymer solution described above, glycidyl methacrylate, a solvent, a catalyst and a polymerization inhibitor which are shown in a "Double bond-introduced reaction liquid" column in Table 1 to mix them, and after introducing air from the air-introducing tube, the mixture was heated up to 90° C. while stirring to react them for 10 hours, whereby a macromer A (polymerizable functional group: methacryloyloxy group) was obtained.

A part of the macromer solution thus obtained was sampled and measured for an acid value to determine an introducing rate of the polymerizable functional group. In the above introducing rate of the polymerizable functional group, an introducing rate of 95% or more is preferably achieved in order to obtain a desired water-insoluble graft polymer.

Apart of the macromer solution thus obtained was dried at 105° C. under reduced pressure for 2 hours to remove the solvent, whereby the macromer was isolated, and the molecular weight thereof was measured by gel permeation chromatography using polystyrene as a standard substance and tetrahydrofuran containing acetic acid of 50 mmol/L as a solvent. A Log P value of the side chain was calculated according to the method described above. A Log P value of benzyl methacrylate is 2.98, and a Log P value of lauryl methacrylate is 6.68. The results thereof are shown in Table 1.

The macromer A thus obtained was used for preparing a water-insoluble graft polymer shown in Preparation Example 4 of Table 2.

Preparation Example 2

Preparation of a 2-ethylhexyl methacrylate/benzyl methacrylate-copolymerized Macromer Having a Polymerizable Functional Group at One End A macromer B (polymerizable functional group: methacryloyloxy group) was prepared by the method of Preparation Example 1 according to compositions shown in the "initial charged monomers" column and the "dropped monomers" column in Table 1, and the physical properties thereof were measured. A Log P value of 2-ethylhexyl methacrylate is 4.64. The results thereof are shown in Table 1.

The macromer B thus obtained was used for preparing a water-insoluble graft polymer shown in Preparation Example 5 of Table 2.

Preparation Example 3

Preparation of a stearyl methacrylate/benzyl methacrylate-copolymerized Macromer Having a Polymerizable Functional Group at One End A macromer C (polymerizable functional group: methacryloyloxy group) was prepared by the method of Preparation Example 1 according to compositions shown in the "initial charged monomers" column and the "dropped monomers" column in Table 1, and the physical properties thereof were measured. A Log P value of stearyl methacrylate is 9.62. The results thereof are shown in Table 1.

The macromer C thus obtained was used for preparing a water-insoluble graft polymer shown in Preparation Example 6 of Table 2.

Comparative Preparation Example 1

A macromer D (polymerizable functional group: methacryloyloxy group) was prepared by the method of Preparation Example 1 according to compositions shown in the "initial charged monomers" column and the "dropped monomers" column in Table 1, and the physical properties thereof were measured. The results thereof are shown in Table 1.

The macromer D thus obtained was used for preparing a water-insoluble graft polymer shown in Comparative Preparation Example 3 of Table 2.

Comparative Preparation Example 2

A macromer E (polymerizable functional group: methacryloyloxy group) was prepared by the method of Preparation Example 1 according to compositions shown in the "initial charged monomers" column and the "dropped monomers" column in Table 1, and the physical properties thereof were measured. The results thereof are shown in Table 1.

The macromer E thus obtained was used for preparing a water-insoluble graft polymer shown in Comparative Preparation Example 4 of Table 2.

TABLE 1

|  | Preparation Example | | | Comparative Preparation Example | |
| --- | --- | --- | --- | --- | --- |
|  | 1 | 2 | 3 | 1 | 2 |
| Initial charged monomers | | | | | |
| Benzyl methacrylate | 20 | 10 | 5 |  | 50 |
| Lauryl methacrylate | 30 |  |  |  |  |
| 2-Ethylhexyl methacrylate |  | 40 |  | 50 |  |
| Stearyl methacrylate |  |  | 45 |  |  |
| Mercaptopropionic acid | 5 | 5 | 5 | 5 | 5 |
| Dropped monomers | | | | | |
| Benzyl methacrylate | 80 | 40 | 20 |  | 200 |
| Lauryl methacrylate | 120 |  |  |  |  |
| 2-Ethylhexyl methacrylate |  | 160 |  | 200 |  |
| Stearyl methacrylate |  |  | 180 |  |  |
| Mercaptopropionic acid | 9 | 9 | 9 | 9 | 9 |
| Double bond-introduced reaction liquid | | | | | |
| Polymer solution described above | 468 | 468 | 468 | 468 | 468 |
| Glycidyl methacrylate | 19 | 19 | 19 | 19 | 19 |
| Tetrabutylammonium bromide | 4.5 | 4.5 | 4.5 | 4.5 | 4.5 |
| Methoquinone | 0.45 | 0.45 | 0.45 | 0.45 | 0.45 |
| Methyl ethyl ketone | 4.5 | 4.5 | 4.5 | 4.5 | 4.5 |
| Macromer obtained | macromer A | macromer B | macromer C | macromer D | macromer E |
| Double bond-introducing rate (%) | 99.0 | 98.5 | 98.0 | 98.5 | 99.4 |
| Weight average molecular weight | 4,100 | 4,100 | 3,900 | 4,100 | 4,200 |
| Number average molecular weight | 2,800 | 2,700 | 2,600 | 2,800 | 2,800 |
| Log P value of side chain | 4.87 | 4.28 | 8.45 | 4.64 | 2.98 |

Preparation Example 4

Preparation of Water-insoluble Graft Polymer

A reactor was charged with 10 parts by weight of methyl ethyl ketone and the prescribed amounts of monomers and a chain transfer agent which are shown in an "initial charged monomers" column in Table 2 to mix them, and substitution with nitrogen gas was sufficiently carried out to obtain a mixed solution.

On the other hand, a dropping funnel was charged with the prescribed amounts of the monomers and the chain transfer agent which are shown in a "dropped monomers" column in Table 2, and 70 parts by weight of methyl ethyl ketone and 2.7 parts by weight of 2,2'-azobis(2,4-dimethylvaleronitrile) were added thereto and mixed, followed by sufficiently carrying out substitution with nitrogen gas to obtain a mixed solution.

The mixed solution in the reactor was heated up to 70° C. under nitrogen atmosphere while stirring, and the mixed solution in the dropping funnel was slowly dropwise added in 3 hours. After 30 minutes passed at 75° C. since finishing dropwise adding, a solution prepared by dissolving 3.6 parts by weight of 2,2'-azobis(2,4-dimethylvaleronitrile) in 110 parts by weight of methyl ethyl ketone was slowly dropwise added in 3 hours. Further, the solution was matured at 80° C. for one hour to obtain a polymer solution.

A part of the polymer solution thus obtained was dried at 105° C. under reduced pressure for 2 hours to remove the solvent, whereby the polymer was isolated, and the weight average molecular weight thereof was measured by gel permeation chromatography using polystyrene as a standard substance and using dimethylforamide dissolving phosphoric acid of 60 mmol/L and lithium bromide of 50 mmol/L as solvents. The results thereof are together shown in Table 2.

A Log P value of styrene is 2.89; a Log P value of methacrylic acid is 0.99; a Log P value of polyoxypropylene monomethacrylate is 2.67; a Log P value of 2-ethylhexyl methacrylate is 4.64; and a Log P value of 2-ethylhexyl acrylate is 4.09.

A Log P value of a nonionic monomer is calculated by the following method.

In the case of, for example, polyoxypropylene monomethacrylate (terminal end: hydroxyl group) described in Table 2, it has a methacryloyoxy group; 12 mole of propylene oxide is added; and it has a hydrogen atom at an end, which means that it has 12 mole of propylene oxide containing methacrylic acid as a fundamental structure. A Log P value of propylene oxide is 0.14, and a Log P value of methacrylic acid is 0.99 according to SRC's LOGKOW/KOWWIN Program of KowWin (Syracuse Research Corporation, USA) described above, and therefore a Log P value of polyoxypropylene monomethacrylate is 2.67 (=0.99+0.14×12) by calculation.

Similarly, in the case of octylpolyethylene glycol polypropylene glycol methacrylate (terminal end: 2-ethylhexyl group) described in Table 2, 8 mole of ethylene oxide and 6 mole of propylene oxide are added thereto based on 2-ethylhexyl methacrylate as a fundamental structure. According to SRC's LOGKOW/KOWWIN Program, a Log P value of ethylene oxide is −0.27, and a Log P value of 2-ethylhexyl methacrylate is 4.64, and therefore a Log P value of octylpolyethylene glycol polypropylene glycol methacrylate is 3.32 (=4.64−0.27×8+0.14×6) by calculation.

Preparation Examples 5 and 6 and Comparative Preparation Examples 3 and 4

Polymer solutions were prepared by the method of Production Example 4 according to compositions shown in the "initial charged monomers" column and the "dropped monomers" column in Table 2.

TABLE 2

|  | Preparation Example | | | Comparative Preparation Example | |
| --- | --- | --- | --- | --- | --- |
|  | 4 | 5 | 6 | 3 | 4 |
| Initial charged monomer | | | | | |
| Styrene | 18.60 | 18.60 | 18.60 | 18.60 | 18.60 |
| Methacrylic acid | 12.00 | 15.00 | 15.00 | 12.00 | 12.00 |
| Polyoxypropylene monomethacrylate*1 | 12.00 |  | 12.00 |  |  |
| Octylpolyethylene glycol polypropylene glycol methacrylate*2 |  | 9.00 |  | 15.00 | 15.00 |
| 2-Ethylhexyl methacrylate | 5.30 | 5.30 | 5.30 | 5.30 | 5.30 |
| 2-Ethylhexyl acrylate | 0.12 | 0.12 | 0.12 | 0.12 | 0.12 |
| Macromer A | 12.00 |  |  |  |  |
| Macromer B |  | 12.00 |  |  |  |
| Macromer C |  |  | 9.00 |  |  |
| Macromer D |  |  |  | 9.00 |  |
| Macromer E |  |  |  |  | 9.00 |
| 2-Mercaptoethanol | 0.21 | 0.21 | 0.21 | 0.21 | 0.23 |
| Dropped monomer | | | | | |
| Styrene | 74.40 | 74.40 | 74.40 | 74.40 | 74.40 |
| Methacrylic acid | 48.00 | 60.00 | 60.00 | 48.00 | 48.00 |
| Polyoxypropylene monomethacrylate | 48.00 |  | 48.00 |  |  |
| Octylpolyethylene glycol polypropylene glycol methacrylate |  | 36.00 |  | 60.00 | 60.00 |
| 2-Ethylhexyl methacrylate | 21.20 | 21.20 | 21.20 | 21.20 | 21.20 |
| 2-Ethylhexyl acrylate | 0.48 | 0.48 | 0.48 | 0.48 | 0.48 |
| Macromer A | 48.00 |  |  |  |  |
| Macromer B |  | 48.00 |  |  |  |
| Macromer C |  |  | 36.00 |  |  |
| Macromer D |  |  |  | 36.00 |  |
| Macromer E |  |  |  |  | 36.00 |
| 2-Mercaptoethanol | 0.84 | 0.84 | 0.84 | 0.84 | 0.92 |
| Water-insoluble graft polymer obtained | | | | | |
| Weight average molecular weight | 74,800 | 62,300 | 82,000 | 114,500 | 54,900 |
| Log P value of principal chain | 2.28 | 2.18 | 2.17 | 2.31 | 2.31 |

TABLE 2-continued

|  | Preparation Example | | | Comparative Preparation Example | |
| --- | --- | --- | --- | --- | --- |
|  | 4 | 5 | 6 | 3 | 4 |
| Log P value of side chain | 4.87 | 4.28 | 8.45 | 4.64 | 2.98 |
| Log P value of side chain - Log P value of principal chain | 2.6 | 2.1 | 6.3 | 2.3 | 0.7 |

*1 polyoxypropylene monomethacrylate (propylene oxide-added mole number = 12, end: hydrogen atom), brand name: Blenmer PP-800, manufactured by Nihon Oil & Fat Corporation
*2 octylpolyethylene glycol polypropylene glycol methacrylate (ethylene oxide-added mole number = 8, propylene oxide-added mole number = 6, end: 2-ethylhexyl group), brand name: Blenmer 50POEP-800B, manufactured by Nihon Oil & Fat Corporation Examples 1 to 3 and Comparative Examples 1 and 2

Polymers 8 parts by weight each obtained by vacuum-drying the polymer solutions obtained in Preparation Examples 4 to 6 and Comparative Preparation Examples 3 and 4 were dissolved in 28 parts by weight of methyl ethyl ketone, and a neutralizing agent (a 5N sodium hydroxide aqueous solution and a 25% ammonia aqueous solution) was added thereto in an amount shown in Table 3 to neutralize the salt-forming group. Further, 32 parts by weight of a dimethylquinacridone base pigment (C.I. Pigment Red 122, manufactured by Dainichiseika Color & Chemicals Mfg. Co., Ltd.) was added thereto to knead the mixture by three rolls for one hour.

Ion-exchanged water 270 parts by weight was added to the kneaded matter thus obtained and stirred, and then methyl ethyl ketone and ammonia were removed at 60° C. under reduced pressure. Further, a part of water was removed to thereby obtain a water dispersion of a pigment-containing water-insoluble lymer having a solid matter concentration of 20% by weight.

The resulting water dispersion 28 parts by weight (solid matter content: 5.6 parts by weight) of the pigment-containing water-insoluble polymer was mixed with 16 parts by weight of diethylene glycol, 1.6 part by weight of SUR-FYNOL 465 (nonionic surfactant manufactured by Nissin Chemical Industry Co., Ltd.) and 34.4 parts by weight of ion-exchanged water, and the mixed liquid obtained was filtered through a no-needle syringe (manufactured by Terumo Co., Ltd.) having a volume of 25 ml equipped with a filter of 0.5 µm (acetyl cellulose membrane, outer diameter: 2.5 cm, manufactured by Fuji Photo Film Co., Ltd.) to remove coarse particles, whereby a water-based ink was obtained.

Next, the water-based ink thus obtained was evaluated based on the following methods. The results thereof are shown in Table 3.

(1) Storage Stability

The ink viscosity (hereinafter referred to as the "viscosity before storage") at 20° C. and 100 r/minute was measured by means of an RE80L type viscometer manufactured by Toki Sangyo Co., Ltd. Further, after storing the ink in a constant temperature bath of 70° C. for one month, the ink viscosity (hereinafter referred to as "viscosity after storage") was measured by the same method.

The storage stability degree (%) was determined as an index for the storage stability according the following equation. The smaller the value, the more excellent the storage stability degree.

storage stability degree (%)=([viscosity after storage]/[viscosity before storage])×100

(2) Discharge Stability

Solid printing of 10 sheets was carried out in a high quality mode on paper of 4024 (product number) manufactured by Fuji Xerox Co., Ltd. by means of a Bubble Jet (registered brand name) printer (model number: HP5551, thermal system) manufactured by Hewlett-Packard Co., Ltd., and the print quality after printing was visually observed and evaluated based on the following evaluation criteria.

Evaluation Criteria:

⊚: no starving ○: little starving ∆: a little starving x: starving (3) Heat Stability An average particle diameter (hereinafter referred to as a "particle diameter before storage") of the polymer particles containing the colorant contained in the ink was measured by means of a laser particle analytical system ELS-8000 manufactured by Otuka Electronics Co., Ltd. Further, after storing the ink in a constant temperature bath of 90° C. for 2 days, the average particle diameter (hereinafter referred to as the "particle diameter after storage") was measured by the same method.

The heat stability degree (%) was determined as an index for the heat stability according the following equation. The smaller the value, the more excellent the heat stability degree.

heat stability degree (%)=([particle diameter after storage]/[particle diameter before storage])×100

(4) Water Resistance

Solid printing was carried out on paper of 4024 (product number) manufactured by Fuji Xerox Co., Ltd. by the printer described above, and it was dried at 25° C. for one hour. A print density of the prescribed part after drying was measured, and then the paper was vertically dipped in still water for 20 seconds and vertically pulled up as it was. After naturally dried at 25° C. for 24 hours, a print density of the same part as before dipping was measured, and a remaining rate of the print density after dipping versus the print density before dipping was determined according the following equation to evaluate the water resistance based on the following evaluation criteria. The print density was measured by means of a Macbeth densitometer (product number: RD914, manufactured by GretagMacbeth Co., Ltd.).

remaining rate (%)=([print density after dipping]/[print density before dipping])×100

Evaluation Criteria:

⊚: remaining rate 95% or more
○: remaining rate 80% or more and less than 95%
∆: remaining rate 60% or more and less than 80%
x: remaining rate less than 60%

TABLE 3

|  | Example | | | Comparative Example | |
| --- | --- | --- | --- | --- | --- |
|  | 1 | 2 | 3 | 1 | 2 |
| 5N-NaOH aqueous solution (weight part) | 2.56 | 3.20 | 3.20 | 2.56 | 2.56 |
| 25% ammonia aqueous solution (weight part) | 0.78 | 0.66 | 0.66 | 0.53 | 0.53 |
| Evaluation result |  |  |  |  |  |
| Storage stability degree (%) | 96 | 98 | 96 | 91 | 119 |
| Viscosity before storage (mPa·s) | 3.12 | 2.93 | 3.42 | 3.31 | 2.84 |
| Viscosity after storage (mPa·s) | 3.01 | 2.88 | 3.28 | 3.02 | 3.37 |
| Discharge stability | ⊚ | ⊚ | ⊚ | ⊚ | x |
| Heat stability (%) | 251 | 190 | 175 | 398 | 1305 |
| particle diameter before storage (μm) | 107 | 102 | 95 | 97 | 107 |
| particle diameter after storage (μm) | 269 | 194 | 166 | 386 | 1396 |
| Water resistance | ⊚ | ⊚ | ⊚ | ⊚ | ⊚ |
| print density before dipping | 1.09 | 1.07 | 1.05 | 1.07 | 1.10 |
| print density after dipping | 1.05 | 1.03 | 1.00 | 1.02 | 1.05 |

It can be found from the results shown in Table 3 that the water-based inks obtained in Examples 1 to 3 are excellent in a discharge stability, a storage stability and a heat stability as compared with those obtained in Comparative Examples 1 and 2 and that they have a high water resistance.

A water-based ink for ink-jet printing which is excellent in a discharge stability, a storage stability and a heat stability and which has a high water resistance is obtained by using the water dispersion of the present invention for ink-jet printing. A system of ink-jet to which the above water-based ink is applied shall not be restricted, and it is particularly suited to a thermal system.

The invention claimed is:

1. A water dispersion for ink-jet printing, wherein it is a water dispersion of water-insoluble graft polymer particles comprising a pigment; the water-insoluble graft polymer comprises a principal chain (A) having a constitutional unit derived from a vinyl base monomer and a side chain (B) which is derived from a macromer (a) containing an aromatic ring and having a polymerizable functional group at one end; both of the Log P values of the principal chain (A) and the side chain (B) are positive; and the value of [(Log P value of the side chain)−(Log P value of the principal chain)] is 1.9 to 12.

2. The water dispersion for ink-jet printing according to claim 1, wherein the Log P value of the side chain is 3.5 to 12.

3. The water dispersion for ink-jet printing according to claim 1, wherein the macromer (a) is a macromer (aa) having an acryloyloxy group or a methacryloyloxy group at one end of a polymer obtained by copolymerizing alkyl(meth)acrylate having 6 to 30 carbon atoms with a vinyl monomer having an aromatic ring having 6 to 30 carbon atoms.

4. The water dispersion for ink-jet printing according to claim 1, wherein the constitutional unit derived from a vinyl base monomer in the principal chain (A) comprises a constitutional unit derived from a salt-forming group-containing monomer (b) and a constitutional unit derived from a hydrophobic monomer (c).

5. The water dispersion for ink-jet printing according to claim 4, wherein the water-insoluble graft polymer is prepared by polymerizing a monomer mixture comprising 10 to 50% by weight of the macromer (a) or macromer (aa), 5 to 40% by weight of the salt-forming group-containing monomer (b) and 10 to 50% by weight of the hydrophobic monomer (c).

6. The water dispersion for ink-jet printing according to claim 4, wherein a weight ratio (c)/(b) of the hydrophobic monomer (c) to the salt-forming group-containing monomer (b) is 30/70 to 80/20.

7. The water dispersion for ink-jet printing according to claim 1, wherein it is a water dispersion of water-insoluble graft polymer particles containing a colorant; the above water-insoluble graft polymer comprises a principal chain (A-1) having a constitutional unit derived from a salt-forming group-containing monomer (b) and a constitutional unit derived from a hydrophobic monomer (c) and a side chain (B-1) derived from a macromer (aa) having an acryloyloxy group or a methacryloyloxy group at one end of a polymer obtained by copolymerizing alkyl(meth)acrylate having 6 to 30 carbon atoms with a vinyl monomer having an aromatic ring having 6 to 30 carbon atoms.

8. The water dispersion for ink-jet printing according to claim 7, wherein the water-insoluble graft polymer is prepared by polymerizing a monomer mixture comprising 10 to 50% by weight of the macromer (aa), 5 to 40% by weight of the salt-forming group-containing monomer (b) and 10 to 50% by weight of the hydrophobic monomer (c).

9. The water dispersion for ink-jet printing as described in claim 7, wherein a weight ratio (c)/(b) of the hydrophobic monomer (c) to the salt-forming group-containing monomer (b) is 30/70 to 80/20.

10. The water dispersion for ink-jet printing according to claim 1 or 7, wherein the water-insoluble graft polymer has a weight average molecular weight of 5,000 to 300,000.

11. A water-based ink for ink-jet printing comprising the water dispersion as defined in claim 1 or 7.

12. The water dispersion of claim 1, wherein said pigment is an inorganic pigment.

13. The water dispersion of claim 1, wherein said pigment is at least one pigment selected from the group consisting of an azo pigment, a diazo pigment, a phthalocyanine pigment, a quinacridone pigment, an isoindoline pigment, a dioxazine pigment, a perylene pigment, a perinone pigment, a thioindigo pigment, an anthraquinone pigment and a quinophthalone pigment.

14. The water dispersion of claim 1, wherein said pigment is not a hydrophobic dye.

* * * * *

UNITED STATES PATENT AND TRADEMARK OFFICE
CERTIFICATE OF CORRECTION

PATENT NO. : 7,625,958 B2
APPLICATION NO. : 11/190965
DATED : December 1, 2009
INVENTOR(S) : Tanaka et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this

Second Day of November, 2010

David J. Kappos
*Director of the United States Patent and Trademark Office*